United States Patent
Conti et al.

(10) Patent No.: US 10,229,041 B2
(45) Date of Patent: Mar. 12, 2019

(54) RUN TIME TPNS WORKLOAD CONTROLS FOR TEST WORKLOAD TUNING IN RELATION TO CUSTOMER PROFILING WORKLOAD

(71) Applicant: International Business Machines Corporation, Armonk, NY (US)

(72) Inventors: Thomas W. Conti, Poughkeepsie, NY (US); Kyle R. Moser, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 15/197,833

(22) Filed: Jun. 30, 2016

(65) Prior Publication Data
US 2018/0004643 A1 Jan. 4, 2018

(51) Int. Cl.
*G06F 9/44* (2018.01)
*G06F 11/36* (2006.01)

(52) U.S. Cl.
CPC ...... *G06F 11/3688* (2013.01); *G06F 11/3696* (2013.01)

(58) Field of Classification Search
CPC .................. G06F 11/3688; G06F 11/3696
USPC ................................................ 717/124–131
See application file for complete search history.

(56) References Cited

U.S. PATENT DOCUMENTS

| | | | | |
|---|---|---|---|---|
| 5,572,674 A | * | 11/1996 | Ernst | H04L 12/26 709/221 |
| 6,542,854 B2 | * | 4/2003 | Yang | G06F 11/3409 702/108 |
| 9,588,816 B2 | | 3/2017 | Zhu et al. | |
| 9,740,600 B2 | | 8/2017 | Vorganti | |
| 2004/0122950 A1 | * | 6/2004 | Morgan | G06F 9/5083 709/226 |
| 2008/0027948 A1 | * | 1/2008 | Corley | G06F 9/5083 |
| 2011/0125895 A1 | | 5/2011 | Anderson et al. | |
| 2011/0145795 A1 | | 6/2011 | Khanapurkar et al. | |
| 2011/0296383 A1 | | 12/2011 | Pasternak | |

OTHER PUBLICATIONS

Steffen Krause, "Tuning the Performance of Change Data Capture in SQL Server 2008", Nov. 2008, retrieved from https://technet.microsoft.com/en-us/library/dd266396 , 17 pages.*

(Continued)

*Primary Examiner* — Ted T Vo
(74) *Attorney, Agent, or Firm* — Cantor Colburn LLP; William Kinnaman

(57) ABSTRACT

Aspects of the present invention include a method, system and computer program product for run time control of a test workload using attainment goals for one or more customer profiling workload characteristics. The method includes modeling, by a processor, a plurality of workload run parameters; providing, by the processor, one or more workload data points to a test workload; responding, by the processor, to a change made by a user to one or more of the plurality of workload run parameters; and adjusting, by the processor, the one or more workload data points based on an change made by a user to one or more of the plurality of workload run parameters.

20 Claims, 6 Drawing Sheets

(56) References Cited

OTHER PUBLICATIONS

SmartBear, "Workload Modeling and Profiles for Load Testing", Sep. 2011, retrieved from https://blog.smartbear.com/software-quality/workload-modeling-and-profiles-for-load-testing/ , 5 pages.*
List of IBM Patents or Patent Applications Treated as Related (Appendix P), Filed Sep. 16, 2016, 2 pages.
Thomas R. Brown, et al., Pending U.S. Appl. No. 15/264,269 Entitled "Using Customer Profiling and Analytics to Create a Relative, Targeted, and Impactful Customer Profiling Environment/Workload Questionnaire" filed Sep. 14, 2016.
Thomas W. Conti, et al., Pending U.S. Appl. No. 15/259,094 Entitled "Z/OS SMF Record Navigation Visualization Tooling" filed Sep. 8, 2016.
Thomas W. Conti, et al., Pending U.S. Appl. No. 15/259,099 Entitled "Measuring and Optimizing Test Resources and Test Coverage Effectiveness Through Run Time Customer Profiling and Analytics" filed Sep. 8, 2016.
Thomas W. Conti, et al., Pending U.S. Appl. No. 15/259,104 Entitled "Using Customer Profiling and Analytics to Understand, Rank, Score, and Visualize Best Practices" filed Sep. 14, 2016.
Thomas W. Conti, et al., Pending U.S. Appl. No. 15/259,107 Entitled "Using Best Practices Customer Adoption Business Intellegence Data as Input to Enterprise Resource Planning (ERP)" filed Sep. 8, 2016.
Thomas W. Conti, et al., Pending U.S. Appl. No. 15/259,110 Entitled "Using Run Time and Historical Customer Profiling and Analytics to Determine Customer Test vs. Production Differences, and to Enhance Customer Test Effectiveness" filed Sep. 8, 2016.
Thomas W. Conti, et al., Pending U.S. Appl. No. 15/259,115 Entitled "Using Run Time and Historical Customer Profiling and Analytics to Determine Customer Disaster Recovery vs Production Differences, and to Enhance Customer Disaster Recovery Readiness and Effectiveness" filed Sep. 8, 2016.
Thomas W. Conti, et al., Pending U.S. Appl. No. 15/259,120 Entitled "Determining If Customer Characteristics by Customer Gography, Country, Culture or Industry May Be Further Applicable to a Wider Customer Set" filed Sep. 8, 2016.
Thomas W. Conti, et al., Pending U.S. Appl. No. 15/259,122 Entitled "Using Customer and Workload Profiling and Analytics to Determine Score, and Report Portability of Customer and Test Environments and Workloads" filed Sep. 8, 2016.
Thomas W. Conti, et al., Pending U.S. Appl. No. 15/259,124 Entitled "Using Customer Profiling and Analytics to Understand Customer Workload Complexity and Characteristics by Customer Geography, Country, and Cuture" filed Sep. 8, 2016.
Thomas W. Conti, et al., Pending U.S. Appl. No. 15/259,130 Entitled "Using Workload Profiling and Analytics and Score Complexity of Test Environments and Workloads" filed Sep. 8, 2016.
Thomas W. Conti, et al., Pending U.S. Appl. No. 15/259,168 Entitled "Using Customer Profiling and Analytics to Understand Customer Environment and Workload Complexity and Characteristics by Industry" filed Sep. 8, 2016.
Thomas W. Conti, et al., Pending U.S. Appl. No. 15/264,630 Entitled "Using Customer Workload Profiling and Analytics to understand and Visualize Customer Workload Execution" filed Sep. 14, 2016.
Thomas W. Conti, et al., Pending U.S. Appl. No. 15/264,631 Entitled "Using Run Time and Historical Customer Profiling and Analytics to Iteratively Design, Develop, Test, Tune, and Maintain a Customer-Like Test Workload" filed Sep. 14, 2016.
Thomas W. Conti, et al., Pending U.S. Appl. No. 15/264,632 Entitled "Using Customer Profiling and Analytics to More Accurately Estimate and Generate and Agile Bill of Requirements and Sprints for Customer or Test Workload Port" filed Sep. 14, 2016.
Thomas W. Conti, et al., Pending U.S. Appl. No. 15/264,634 Entitled "Standardizing Run-Time and Historical customer and Test Environments and Workloads Comparisons Using Specific Sets of Key Platform Data Points" filed Sep. 14, 2016.
Thomas W. Conti, et al., Pending U.S. Appl. No. 15/264,638 Entitled "Using Run-Time and Historical Customer Profiling and Analytics to Determine and Score Customer Adoption Levels of Platform Technologies" filed Sep. 14, 2016.
Thomas W. Conti, et al., Pending U.S. Appl. No. 15/264,639 Entitled "Standardizing Customer and Test Data and Information Collection for Runtime and Historical Profiling Environments and Workload Comparisons" filed Sep. 14, 2016.
List of IBM Patents or Patent Applications Treated as Related (Appendix P), Filed Apr. 18, 2017, 2 pages.
Thomas R. Brown, et al., Pending U.S. Appl. No. 15/424,971 Entitled "Run Time Workload Threshold Alerts for Customer Profiling Visualization" filed Feb. 6, 2017.
Thomas R. Brown, et al., Pending U.S. Appl. No. 15/427,129 Entitled "Run Time and Historical Workload Report Scores for Customer Profiling Visualization" filed Feb. 8, 2017.
Thomas W. Conti, et al., Pending U.S. Appl. No. 15/424,965 Entitled "Using Customer Profiling and Analytics to Understand Customer Environment and Workload Complexity and Characteristics by Industry" filed Feb. 6, 2017.
Thomas W. Conti, et al., Pending U.S. Appl. No. 15/424,973 Entitled "Run Time Test Workload Customer Profiling Baselines Visualization" filed Feb. 6, 2017.
Thomas W. Conti, et al., Pending U.S. Appl. No. 15/427,130 Entitled "Visual Test Workload Execution Modeling" filed Feb. 8, 2017.
Thomas W. Conti, et al., Pending U.S. Appl. No. 15/427,135 Entitled "Run Time Automatic Workload Tuning Using Customer Profiling Workload Comparison" filed Feb. 8, 2017.
Thomas W. Conti, et al., Pending U.S. Appl. No. 15/427,137 Entitled "Using Test Workload Run Facts and Problem Discovery Data as Input for Business Analytics to Determine Test Effectiveness" filed Feb. 8, 2017.
Thomas W. Conti, et al., Pending U.S. Appl. No. 15/429,262 Entitled "Measuring and Optimizing Test Resources and Test Coverage Effectiveness Through Run Time Customer Profiling and Analytics" filed Feb. 10, 2017.
Thomas W. Conti, et al., Pending U.S. Appl. No. 15/429,265 Entitled "Using Run Time and Historical Customer Profiling and Analytics to Determine Customer Disaster Recovery vs Production Differences, and to Enhance Customer Disaster Recovery Readiness and Effectiveness" filed Feb. 10, 2017.
Thomas W. Conti, et al., Pending U.S. Appl. No. 15/429,268 Entitled "Using Workload Profiling and Analytics and Score Complexity of Test Environments and Workloads" filed Feb. 10, 2017.
Anonymous, "A Method and Process for Workload Mapped Empirical System Data and Workloads with Direct Mapped Tuning Capability", (Aug. 8, 2011) IP.com, IPCOM000209519D; 3 pgs.
Anonymous, "Customer Workload Optimized Application", (May 2, 2011) IP.com, IPCOM000206688D; 3 pgs.
List of IBM Patents or Patent Applications Treated as Related (Appendix P), Filed Jun. 30, 2016, 2 pages.
Thomas R. Brown, et al., Pending U.S. Appl. No. 15/197,826 Entitled "Run Time Workload Threshold Alerts for Customer Profiling Visualization" filed Jun. 30, 2016.
Thomas R. Brown, et al., Pending U.S. Appl. No. 15/197,828 Entitled "Run Time and Historical Workload Report Scores for Customer Profiling Visualization" filed Jun. 30, 2016.
Thomas R. Brown, et al., Pending U.S. Appl. No. 15/197,835 Entitled "Z/OS SMF/RMF Workload Data Playback with Web Dashboard Visualization" filed Jun. 30, 2016.
Thomas W. Conti, et al., Pending U.S. Appl. No. 15/197,827 Entitled "Run Time Test Workload Customer Profiling Baselines Visualization" filed Jun. 30, 2016.
Thomas W. Conti, et al., Pending U.S. Appl. No. 15/197,829 Entitled "Run Time Automatic Workload Tuning Using Customer Profiling Workload Comparison" filed Jun. 30, 2016.
Thomas W. Conti, et al., Pending U.S. Appl. No. 15/197,831 Entitled "Using Test Workload Run Facts and Problem Discovery Data as Input for Business Analytics to Determine Test Effectiveness" filed Jun. 30, 2016.
Thomas W. Conti, et al., Pending U.S. Appl. No. 15/197,843 Entitled "Visual Test Workload Execution Modeling" filed Jun. 30, 2016.

(56) References Cited

OTHER PUBLICATIONS

Thomas W. Conti, et al., Pending U.S. Appl. No. 15/197,844 Entitled "Run Time SMF/RMF Statistical Formula Methodology for Generating Enhanced Workload Data Points for Customer Profiling Visulization" filed Jun. 30, 2016.

* cited by examiner

US 10,229,041 B2

RUN TIME TPNS WORKLOAD CONTROLS FOR TEST WORKLOAD TUNING IN RELATION TO CUSTOMER PROFILING WORKLOAD

BACKGROUND

The present invention relates to the testing of software, and more specifically, to a method, system and computer program product that implement aspects of workload and operational profiling, thereby resulting in improvements in the testing of customer software.

In the field of software testing, as in many other technical fields, improvements are constantly being sought, primarily for cost and accuracy reasons. A fundamental goal of software testing in theory is to identify all of the problems in a customer's software program before the program is released for use by the customer. However, in reality this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes modeling, by a processor, a plurality of workload run parameters; and providing, by the processor, one or more workload data points to a test workload. The method also includes responding, by the processor, to a change made by a user to one or more of the plurality of workload run parameters; and adjusting, by the processor, the one or more workload data points based on a change made by a user to one or more of the plurality of workload run parameters.

According to another embodiment of the present invention, a system includes a processor in communication with one or more types of memory, the processor configured to model a plurality of workload run parameters; and the processor configured to provide one or more workload data points to a test workload. The system also includes the processor configured to respond to a change made by a user to one or more of the plurality of workload run parameters; and the processor configured to adjust the one or more workload data points based on a change made by a user to one or more of the plurality of workload run parameters.

According to yet another embodiment of the present invention, a computer program product includes a non-transitory storage medium readable by a processing circuit and storing instructions for execution by the processing circuit for performing a method that includes modeling, by a processor, a plurality of workload run parameters; and providing, by the processor, one or more workload data points to a test workload. The method also includes responding, by the processor, to a change made by a user to one or more of the plurality of workload run parameters; and adjusting, by the processor, the one or more workload data points based on a change made by a user to one or more of the plurality of workload run parameters.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
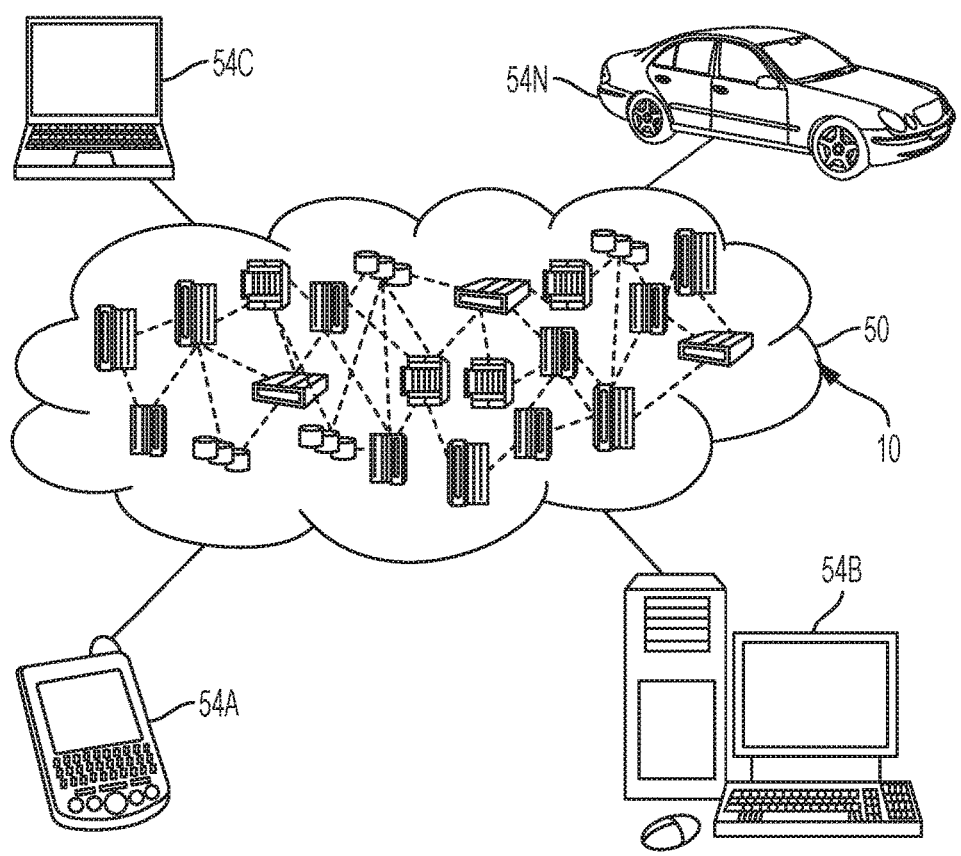
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
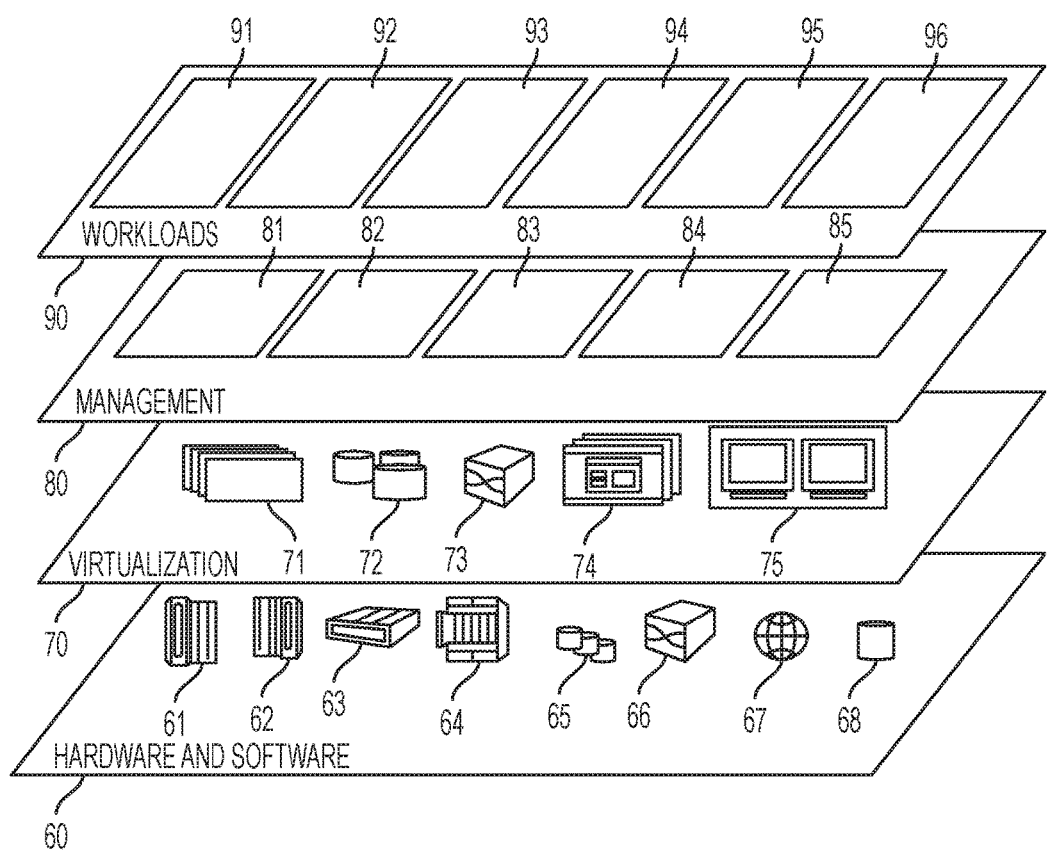
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for run time control of a test workload using attainment goals for one or more customer profiling workload characteristics in accordance with one or more embodiments of the present invention.

Figure 3:
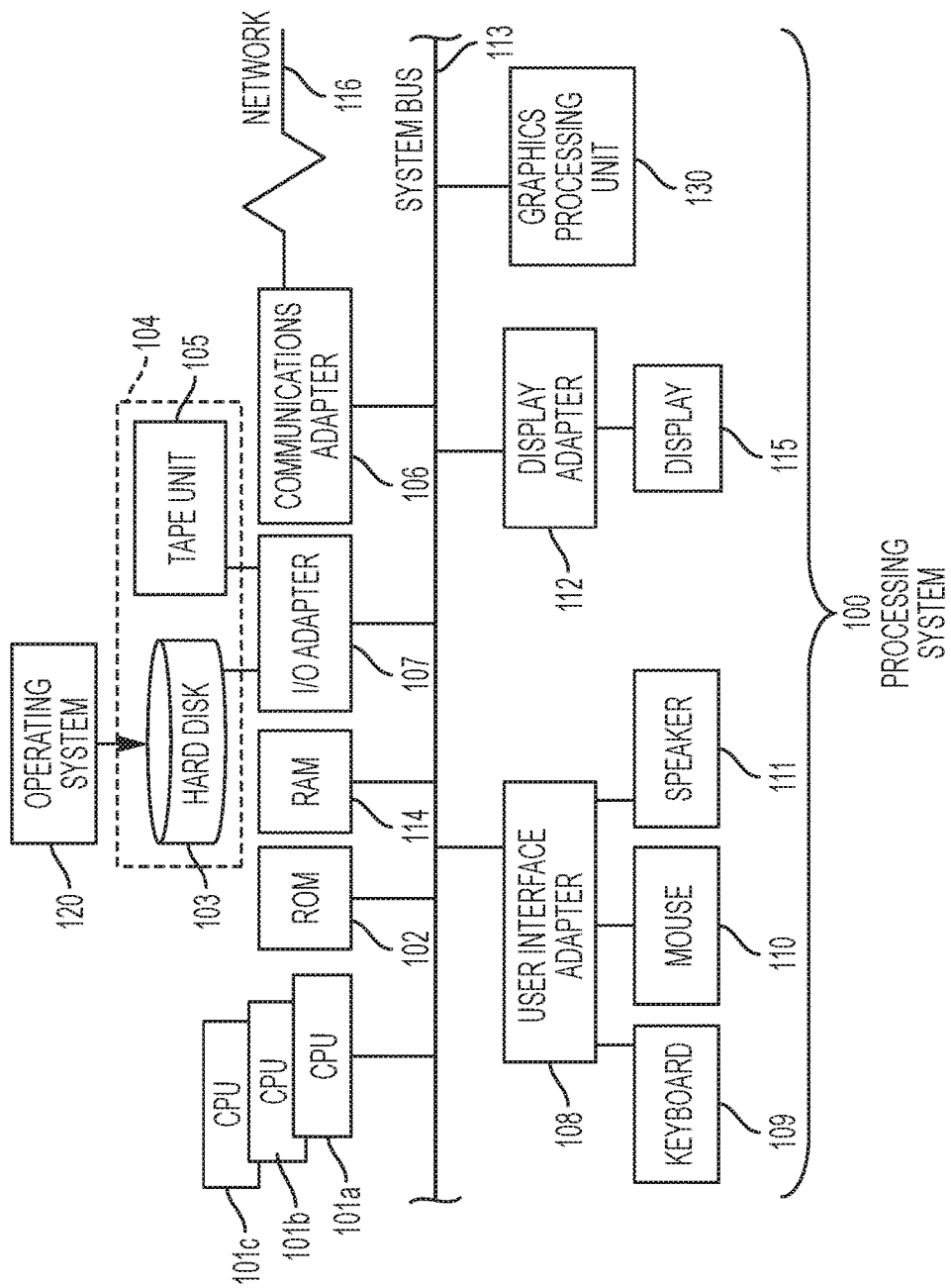
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for run time control of a test workload using attainment goals for one or more customer profiling workload characteristics.

One or more embodiments of the present invention use a workload that can accept at least one parameter and allow at least one control to thereby provide a web interface to control a workload while storing the parameters used and all of the controls issued so that the data can be used in run time displays and in post processing data analytics.

Also, one or more embodiments of the present invention provide for controlling a workload from a web application while storing all parameters, parameter changes, controls, control changes, and scenarios registration as workload run facts that support a big data infrastructure of workload run facts collection. The run facts are consumed by analytics processing as part of the larger scope of workload run facts. Additionally, the customer and test data may be compared and scored so that changes can be directed by the data.

Exemplary embodiments of the present invention provide a run time test workload control and customization mechanism to interface with a customer profiling workload comparison and assessment system. This is done to automatically (or manually) tune a test workload, using attainment goals for key customer profiling workload characteristics set by the end user. Embodiments comprise the integration of the IBM Teleprocessing Network Simulator ("TPNS") product with the customer profiling workload comparison and assessment system. The IBM TPNS product is a test automation tool that simulates one or many network terminals to a mainframe computer system, for functional testing, regression testing, system testing, capacity management, benchmarking and stress testing.

In one or more embodiments of the present invention, TPNS is used with customer profiling workload data to tune test workloads, resulting in more customer-like test workloads.

Test workload runs can be complicated, resource and time intensive, limited in availability, and financially expensive to configure, stage, run, and analyze, and can span multiple days or even weeks (often including non-user monitored off-shift and weekend time). Therefore, according to one or more embodiments of the present invention, providing for run time functionality to automatically or manually adjust or tune the test workload using customer profiling workload(s) comparisons can be relatively cost and time effective. TPNS test workload control and customization provides this run time capability and interface with the customer profiling workload comparison and assessment system, as executed through run time monitoring of customer profiling workload data for ongoing comparison and tuning.

Thus, exemplary embodiments provide for multiple capabilities, efficiencies, and financial benefits for the test user or operator, including optimizing the run time effectiveness of the test workload (hereinafter defined as including software, hardware, and firmware) run based on a prioritized list(s) of goals. The intended goals may include emulating key characteristics of a customer workload environment, a test recreation or replication, benchmark achievement and/or performance test goals, etc. The intended goals may also include matching the different key workload characteristics based on the type of workload at a specific time of day. For example, batch overnight and online during the day.

Other capabilities, efficiencies, and financial benefits for the test user or operator include tuning test workloads to be relatively much closer to their intended goal through the very nature of faster and continuous automated tuning, response/feedback, and analysis as tuning input. Also, significantly reducing the amount of limited and high value operating system systems, storage, network, environmental, personnel time and resources to accomplish test objectives, resulting in both financial savings and reduced environmental impact. Further, increasing test plan efficiency through expanded functional test coverage, resulting in enhanced product quality and greater customer satisfaction. By the reduction of repeat test workload runs through higher individual workload run effectiveness, the test user or operator can run additional and/or expanded test cases and scenarios, and ensure each workload run maximizes a successful outcome.

In one or more additional embodiments of the present invention, the run time test workload control and customization method and system may be integrated with a customer profiling baselines visualization web based application, including the report scores and workload tuning controls. This allows for the automatic or manual issuance of run time TPNS workload control commands and scripting to a test system workload to achieve target customer functional, stress, scalability, and/or other key workload characteristics. The TPNS workload controls serve as the test workload's automatic or manual tuning mechanism.

The customer profiling baselines visualization web application may utilize existing customer data coupled with the live collection of test data, and store this data in a database. The data may be used in a web application to visually represent the levels of load and stress and ratios of activity for sets of related data points. With this customer profiling baselines visualization web application, the TPNS product comprises the workload control and tuning mechanism that provides the capability to automatically or manually adjust the test workload in comparison to the customer profiling workload, using the test workload goals specified by the test user.

Given that the attainment goals of many test workload efforts are to match or exceed key characteristics of customer profiling workloads, and that customer profiling workload transaction complexities and activity rates can vary significantly throughout the course of a workload run (for example, between both customer batch and online workloads), a flexible and robust control methodology and system is needed to adjust the test workload at run time in relation to the potentially changing customer profiling workload.

This workload control is capable of run time test workload manual and automated interaction; callable from a web interface and/or workload monitoring program through, e.g., JCL submission; and able to provide a significant number and variety of mature, robust, and customizable workload controls.

Also, run time adjustment of a large range of test workload transaction types, mixes, and activity rates is fundamental to the attainment of the test workload success criteria to achieve similar customer workload complexity and similarities.

Similarly, this workload transaction flexibility, scalability, and customization is are required in order to successfully integrate with the customer profiling baselines visualization web application for a wide range of test workloads. As customer workload types and their complexities can vary widely, a robust workload control and customization methodology and system is required, including a focus on reusable technology across different workloads.

The IBM TPNS product provides this test workload control mechanism and necessary flexibility, customization, and integration with the customer profiling baselines visualization web application, including these workload control and customization features: stop, start, update and reset; transaction mix, rate, customization, scalability, and response time; inter-user communications; network simulation; user count variation; flexible and advanced scripting utilities and functionality; remote display and control; comprehensive logging; and many other key workload controls and adjustments.

Figure 4:
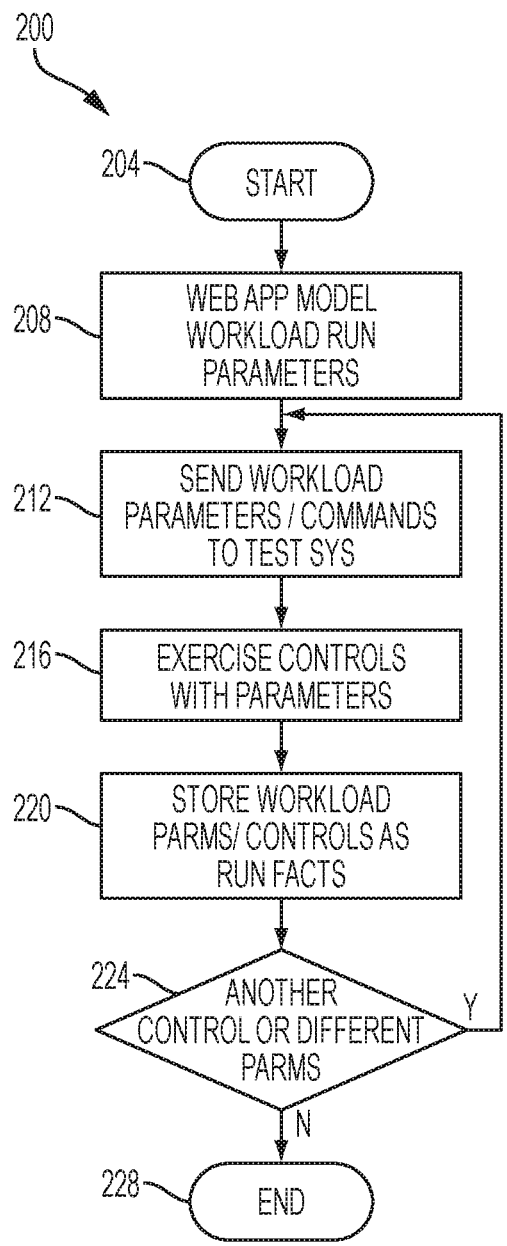
FIG. 4 is a flow diagram of a method for run time control of a test workload using attainment goals for one or more customer profiling workload characteristics, in accordance with one or more embodiments of the present invention.

With reference now to FIG. 4, a flow diagram illustrates a method 200 according to one or more embodiments of the present invention for run time control of a test workload using attainment goals for one or more customer profiling workload characteristics.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

Figure 6:
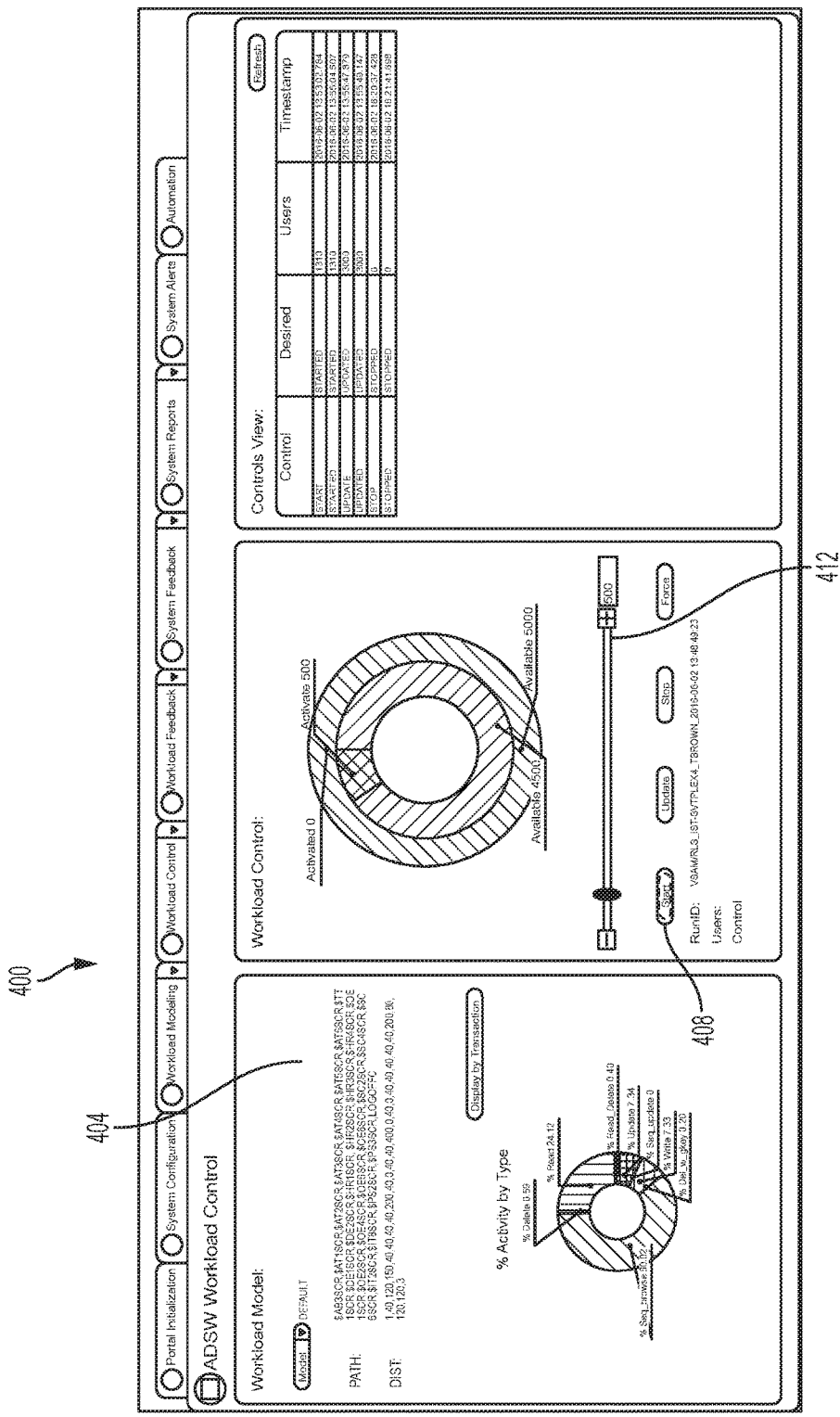
FIG. 6 is a visual diagram on a screen display of workload control functions, in accordance with one or more embodiments of the present invention.

The method 200 begins in block 204, followed by block 208 in which an operation is performed in which a web application models one or more workload run parameters. For example, the web application may comprise the aforementioned customer profiling baselines visualization web application. FIG. 6 depicts a visual diagram 400 on a screen display of workload control functions. The diagram 400 may be a part of the customer profiling baselines visualization web application, in accordance with one or more embodiments of the present invention. In exemplary embodiments, the "Workload Model" may be as shown in the area 404 of the diagram 400 of FIG. 6, where various workload parameters can be displayed visually to the user or test operator.

Figure 5:
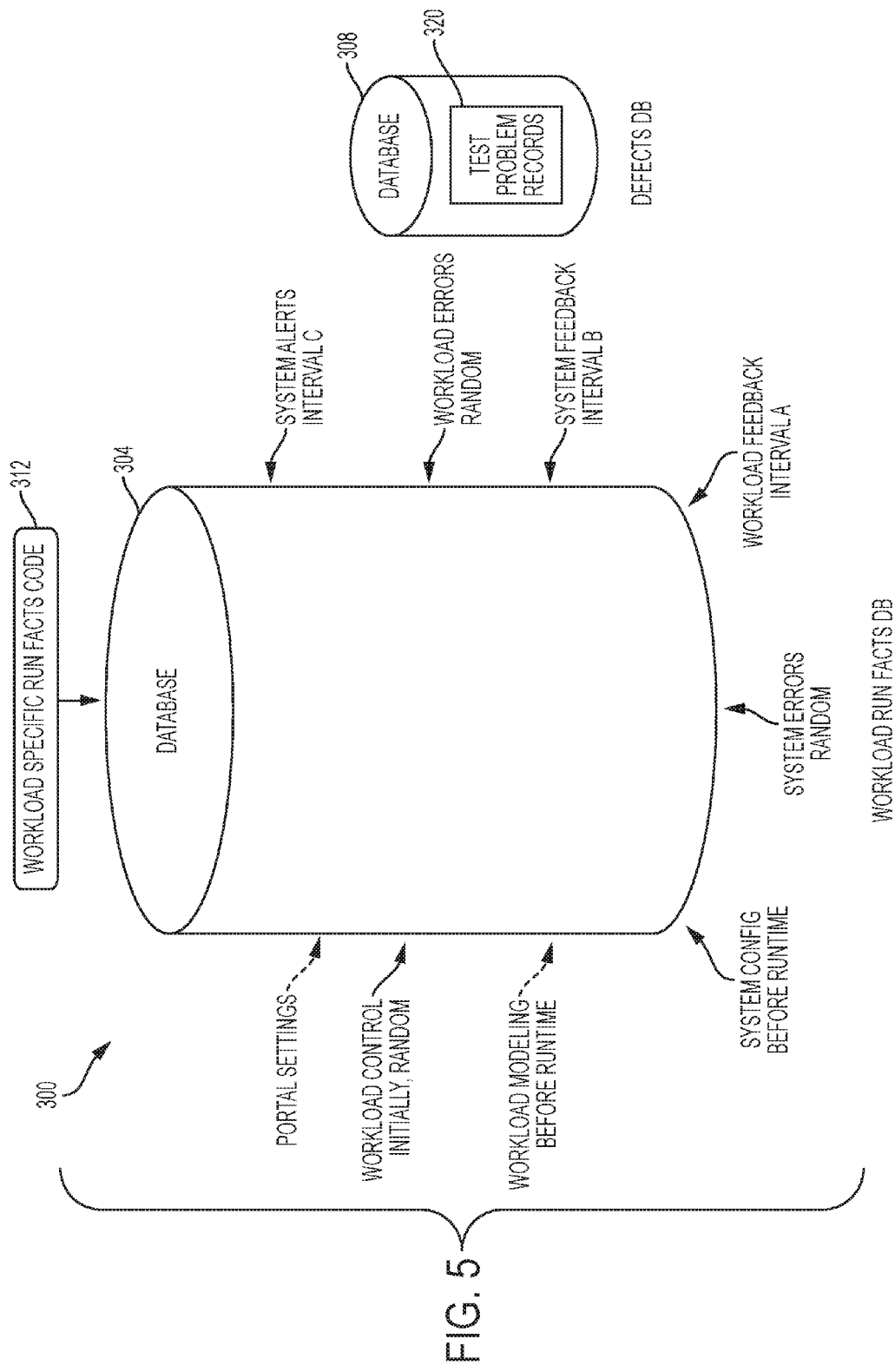
FIG. 5 is a block diagram of a system having two databases that store various types of data for use with the method of FIG. 4, in accordance with one or more embodiments of the present invention.

Referring also to FIG. 5, there illustrated is a block diagram of a system 300 having two databases 304, 308 that store various types of data for use with the method of FIG. 4, in accordance with one or more embodiments of the present invention. For example, the database 304 may store workload specific run facts code or data 312. Also, the database 308 may store test problem records or data 320. The databases 304, 308 may be a part of the cloud computing environment 50 of FIGS. 1 and 2, or a part of the processing system 100 of FIG. 3, or in some other type of computing or processing environment.

In block 212, an operation is performed in which various workload parameters and/or commands are sent to the test system for use during the test.

In block 216, an operation is performed in which the test exercises various controls using the workload parameters sent to the test system in block 212. This can be commanded by a user through use of a visual button function 408 on the diagram 400 of the display screen. In other words, the user may position a cursor using, e.g., a mouse, over the "Start" button on the diagram 400 in FIG. 6. Also, the test operator may also utilize a horizontal slider function 412 on the diagram 400 of FIG. 6 as another way of exercising control using the workload parameters.

In block 220, an operation is performed in which the various workload parameters and controls selected by the test operator or user may be stored in the database 304 as various types of workload run facts.

In block 224, an operation is performed to determine if another control or a different parameter is available. If not, the method 200 ends in block 228. If so, the method 200 transitions back to block 212.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising,"

"includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   modeling, by a processor, a plurality of workload run parameters;
   providing, by the processor, one or more workload data points to a test workload;
   responding, by the processor, to a change made by a user to one or more of the plurality of workload run parameters;
   adjusting, by the processor, the one or more workload data points based on a change made by a user to one or more of the plurality of workload run parameters, wherein the change to the one or more of the plurality of workload run parameters is based on one or more attainment goals associated with customer profile workload characteristics provided by the user;
   generating, by the processor, a visualization of levels of load and stress, and ratios of activity for one or more sets of data points associated with the one or more workload data points; and
   displaying, by a user interface, the visualization.

2. The computer-implemented method of claim 1 wherein modeling, by a processor, a plurality of workload run parameters comprises modeling, by the processor, a plurality of workload run parameters via the user interface.

3. The computer-implemented method of claim 2 wherein the user interface employs a web application.

4. The computer-implemented method of claim 1 wherein the one or more workload data points is from the group consisting of parameters and commands.

5. The computer-implemented method of claim 1 further comprising storing, by the processor, the one or more workload data points in a database.

6. The computer-implemented method of claim 5 wherein storing, by the processor, the one or more workload data points in a database comprises storing, by the processor the one or more workload data points in a database as workload run facts.

7. The computer-implemented method of claim 1 wherein the one or more attainment goals comprises at least one of: emulating key characteristics of a customer workload environment, a test recreation or replication, benchmark achievement and/or performance test goals, and matching the different workload characteristics based on a type of workload at a specific time of day.

8. A system comprising:
   a processor in communication with one or more types of memory, the processor configured to:
   model a plurality of workload run parameters;
   provide one or more workload data points to a test workload;
   respond to a change made by a user to one or more of the plurality of workload run parameters; and
   adjust the one or more workload data points based on a change made by a user to one or more of the plurality of workload run parameters, wherein the change to the one or more of the plurality of workload run parameters is based on one or more attainment goals associated with customer profile workload characteristics provided by the user;
   generate a visualization of levels of load and stress, and ratios of activity for one or more sets of data points associated with the one or more workload data points; and
   a user interface, wherein the user interface displays the visualization.

9. The system of claim 8 wherein the processor configured to model a plurality of workload run parameters comprises the processor configured to model a plurality of workload run parameters via the user interface.

10. The system of claim 9 wherein the user interface employs a web application.

11. The system of claim 8 wherein the one or more workload data points is from the group consisting of parameters and commands.

12. The system of claim 8 wherein the processor is further configured to store the one or more workload data points in a database.

13. The system of claim 12 wherein the processor configured to store the one or more workload data points in a database comprises the processor configured to store the one or more workload data points in a database as workload run facts.

14. The system of claim 8 wherein the one or more attainment goals comprises at least one of: emulating key characteristics of a customer workload environment, a test recreation or replication, benchmark achievement and/or performance test goals, and matching the different workload characteristics based on a type of workload at a specific time of day.

15. A computer program product comprising:

a non-transitory storage medium readable by a processing circuit and storing instructions for execution by the processing circuit for performing a method comprising:

modeling, by a processor, a plurality of workload run parameters;

providing, by the processor, one or more workload data points to a test workload;

responding, by the processor, to a change made by a user to one or more of the plurality of workload run parameters; and adjusting, by the processor, the one or more workload data points based on a change made by a user to one or more of the plurality of workload run parameters, wherein the change to the one or more of the plurality of workload run parameters is based on one or more attainment goals associated with customer profile workload characteristics provided by the user;

generating, by the processor, a visualization of levels of load and stress, and ratios of activity for one or more sets of data points associated with the one or more workload data points; and displaying, by a user interface, the visualization.

16. The computer program product of claim 15 wherein modeling, by a processor, a plurality of workload run parameters comprises modeling, by the processor, a plurality of workload run parameters via the user interface.

17. The computer program product of claim 16 wherein the user interface employs a web application.

18. The computer program product of claim 15 wherein the one or more workload data points is from the group consisting of parameters and commands.

19. The computer program product of claim 15 further comprising storing, by the processor, the one or more workload data points in a database.

20. The computer program product of claim 15 wherein the one or more attainment goals comprises at least one of: emulating key characteristics of a customer workload environment, a test recreation or replication, benchmark achievement and/or performance test goals, and matching the different workload characteristics based on a type of workload at a specific time of day.

\* \* \* \* \*